(12) United States Patent
Dupre

(10) Patent No.: US 9,471,861 B2
(45) Date of Patent: Oct. 18, 2016

(54) METHOD FOR PRINTING A PRINT JOB ON A MEDIA

(71) Applicant: OCE-TECHNOLOGIES B.V., Venlo (NL)

(72) Inventor: Michael Dupre, Brunoy (FR)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/965,330

(22) Filed: Dec. 10, 2015

(65) Prior Publication Data

US 2016/0092759 A1    Mar. 31, 2016

Related U.S. Application Data

(63) Continuation of application No. PCT/EP2014/063240, filed on Jun. 24, 2014.

(30) Foreign Application Priority Data

Jun. 26, 2013 (EP) .................................... 13305892

(51) Int. Cl.
*G06F 15/00* (2006.01)
*G06K 1/00* (2006.01)
(Continued)

(52) U.S. Cl.
CPC ........... *G06K 15/4065* (2013.01); *G06F 3/125* (2013.01); *G06F 3/1219* (2013.01);
(Continued)

(58) Field of Classification Search
CPC . G06K 15/4065; G06F 3/1219; G06F 3/125; G06F 3/1285; G06F 3/1229; G06F 3/1252; G06F 2206/151; H04N 1/00342; H04N 1/00663; H04N 2201/0074; H04N 2201/0082

USPC .............. 358/1.1, 1.12, 1.2, 1.18, 1.15, 1.13
See application file for complete search history.

(56) References Cited

U.S. PATENT DOCUMENTS

| 7,668,754 B1 | 2/2010 | Bridgelall |
| 2009/0174893 A1 | 7/2009 | Fujii et al. |

(Continued)

FOREIGN PATENT DOCUMENTS

| JP | 2006-203631 A | 8/2006 |
| WO | WO 2004/058509 A1 | 7/2004 |
| WO | WO 2012/057803 A1 | 5/2012 |

*Primary Examiner* — Douglas Tran
(74) *Attorney, Agent, or Firm* — Birch, Stewart, Kolasch & Birch, LLP

(57) ABSTRACT

The invention relates to a method for printing a digital image on a piece of media by means of a printer system comprising a printer and a computer for storing digital objects, the method comprising the steps of printing at least one digital image on a piece of media, cutting the printed at least one digital image out of the piece of media, attaching an identifying object to the leftover of the piece of media, storing the leftover of the piece of media in a depository, and storing a digital object representing the leftover of the piece of media in a database on the computer, wherein the digital object comprises a reference to the attached identifying object. The invention also relates to a method for printing a print job on a printer system, the method comprises the steps of submitting a print job for printing at least one digital image to the printer system, selecting a digital object from a database comprising digital objects representing a collection of leftovers of pieces of media in a depository and each comprising a reference to an identifying object of the corresponding leftover, wherein the leftover represented by the selected digital object is large enough to print the at least one digital image upon said leftover, retrieving the reference from the selected digital object, locating in the depository the leftover represented by the digital object by means of the retrieved reference, and printing the at least one digital image on the leftover.

14 Claims, 1 Drawing Sheet

(51) Int. Cl.
*G06K 15/00* (2006.01)
*G06F 3/12* (2006.01)
*H04N 1/00* (2006.01)

(52) U.S. Cl.
CPC .......... *G06F3/1229* (2013.01); *G06F 3/1252* (2013.01); *G06F 3/1285* (2013.01); *H04N 1/00342* (2013.01); *H04N 1/00663* (2013.01); *G06F 2206/151* (2013.01); *H04N 2201/0074* (2013.01); *H04N 2201/0082* (2013.01)

(56) References Cited

U.S. PATENT DOCUMENTS

2010/0102505 A1* 4/2010 Ikeuchi .................. B65H 1/14
 271/262
2013/0003088 A1 1/2013 Feng
2015/0103364 A1* 4/2015 Abe .................. H04N 1/00477
 358/1.13

\* cited by examiner

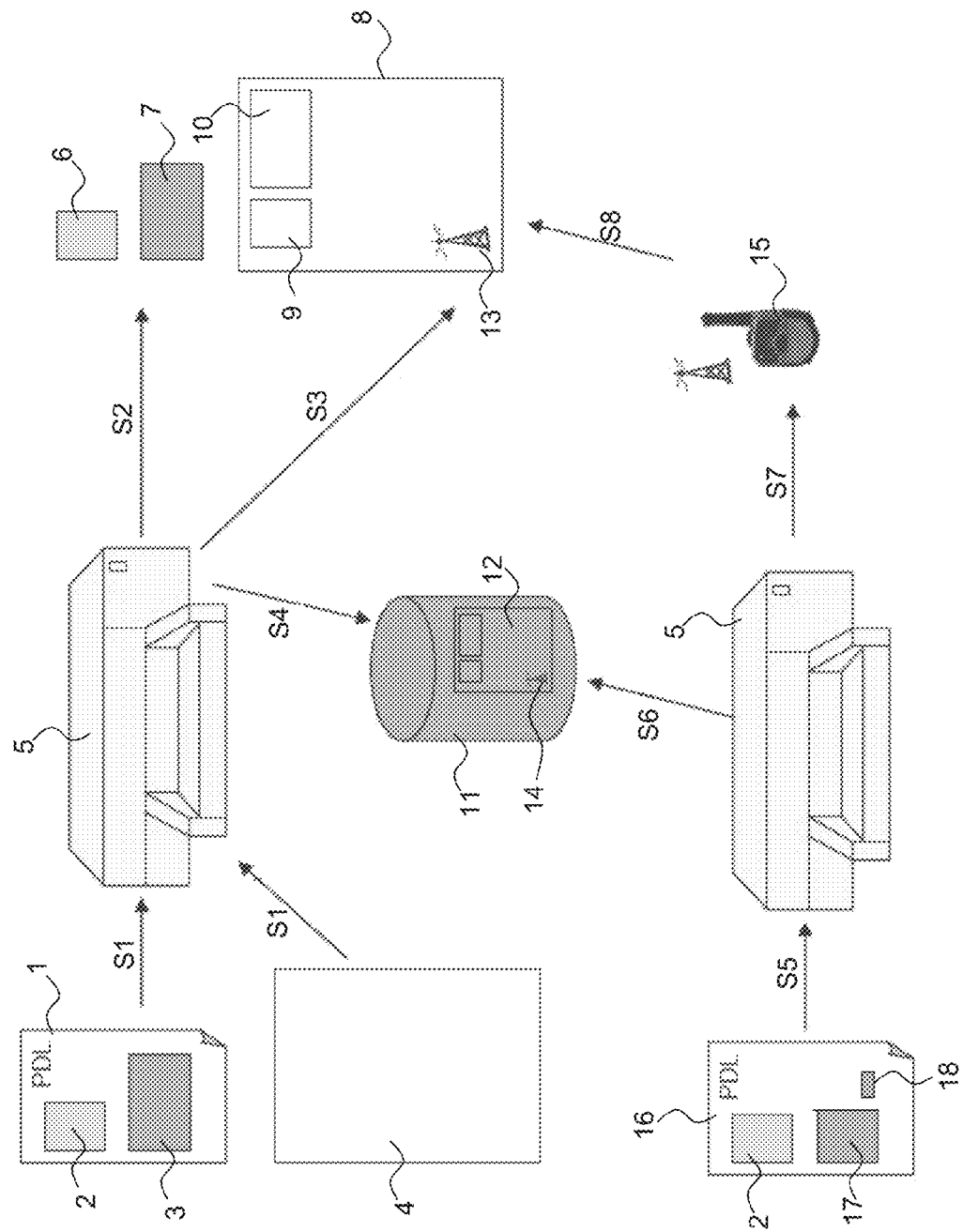

METHOD FOR PRINTING A PRINT JOB ON A MEDIA

CROSS REFERENCE TO RELATED APPLICATIONS

This application is a Continuation of PCT International Application No. PCT/EP2014/063240, filed on Jun. 24, 2014, which claims priority under 35 U.S.C. 119(a) to patent application Ser. No. 13/305,892.5, filed in Europe on Jun. 26, 2013, all of which are hereby expressly incorporated by reference into the present application.

FIELD OF THE INVENTION

The present invention relates to a method for printing a print job on a printer system, the method comprising the steps of receiving a print job for printing at least one digital image by the printer system, and determining media characteristics of a media for printing the print job on. Printer systems usually apply recording material, like colorants, on a piece of media in the form of toner or ink according to a digitally defined, two-dimensional pattern of pixels with values that indicate a composition of these colorants. This pattern is generated out of a digital image, that may comprise objects in either vectorized or rasterized format, using conventional techniques like interpretation, rendering, and screening by a raster image processor. The processing of a digital image includes colour management to convert colour values of the pixels in the digital image into composition values related to the printer colour space as is set up by the colorants of the print system. Depending on the intended print quality and the characteristics of the print process, the pixels of the pattern may be printed in one or more passes. Media characteristics which may be determined are weight, colour, an elevation profile, dimensions, transparency, glossiness, media type, etc.

The present invention further relates to a recording medium comprising computer executable program code configured to instruct a computer to perform a method according to the invention.

BACKGROUND OF THE INVENTION

An issue around media handling, especially in the Graphics Art segment, is media waste handling and re-use. Basically, media waste is left over rather than re-used because of the complexity to find it again in a repository. The amount and the mix between rigid and flexible media make it very hard to combine floor space usage and lean sorting.

It is an objective of the invention to facilitate an easier way of retrieving a leftover of a media that the user wishes to re-use.

SUMMARY OF THE INVENTION

According to the present invention this objective is achieved by a method according to the present invention, wherein the method comprises the further steps of determining whether a usable left over piece remains after printing the print job on the media, printing the print job on the media, including cutting the at least one printed digital image out or off from the media and providing the remaining left over piece with a machine readable tag, and storing in a database an identifier encoded in the machine readable tag, together with the determined media characteristics.

A print job is printed on a piece of media. The printed part of the piece of media is removed from the piece of media resulting in a leftover of the piece of media. For example, the printed part of the piece of media may be cut off or cut out by a cutting device and the result is a leftover of the piece of media with decreased dimensions or with holes in it. A machine readable tag is attached to the leftover of the media if the leftover is suitable for re-use, for example if the leftover has dimensions which are larger than predetermined minimum dimension sizes. The leftover may be stored in a depository. An identifier is encoded in the machine readable tag and stored in the database together with the determined media characteristics, and optionally together with further properties of the leftover which are derivable from the characteristics of the digital image to be printed by the print job like shape, height and width, from the characteristics of the piece of media like dimensions of the original piece of media and others as mentioned before, but also supplier of the original piece of media, a batch of the original piece of media, a time of arrival at stock of the original piece of media, and from the location at which the digital image is printed on the piece of media, for example the location of holes in the leftover. The database may reside on a computer which is comprised or connected to the printer system.

According to the present invention the object is also achieved by a method according to the preamble, wherein the method comprises the further steps of retrieving from a database an identifier corresponding to a leftover of media of the determined media characteristics, wherein the identifier is encoded in a machine readable tag on the leftover, the leftover being a leftover after a printing and a cutting operation applied upon the media after printing, locating the leftover corresponding to the identifier by means of the machine readable tag on the left over, and printing the at least one digital image on the located leftover.

When the user wants to print a next print job on a wished media, the collection of leftovers in the database may be compared to the wishes of the user qua media characteristics, like type of media, supplier, batch, or received time at stock, to the dimensions of the leftovers and to the dimensions of the digital image to be printed according to the next print job. When a leftover is found in the database and which meets all other wishes of the user, the identifier of the found leftover is used to locate the leftover, for example in a depository. When the leftover is located and fetched, the leftover may be used to print the next print job on the leftover by the printer of the printer system.

According to a further embodiment the retrieved identifier corresponds to a leftover which is large enough to print the at least one digital image upon. The retrieving step has this extra condition of sufficient largeness to make the operator more productive in finding a suitable leftover.

According to another further embodiment of the method the locating step comprises a sub-step of using a portable radio system to find the leftover, wherein the machine readable tag on the leftover is detectable by the portable radio system and corresponding to the retrieved identifier. Today it is possible to print a RFID on various media using aluminium and for a cheap price. Micro localization RFID systems exist today, that can detect a RFID from a distance, even without visual contact. A small RFID may be printed on the leftover. The radio system can detect the RFID from a close range, for example some meters. The radio system in combination with the database of the properties of the leftovers, like supplier, batch, received time at stock, dimensions, shape and media characteristics, enables the user to locate suitable media stored away in a depository for future re-use more easily. Besides the use of RFID, other kind of technologies like NFC may be applied.

According to another further embodiment the database comprises for each leftover a cut path applied to the leftover, which cut path is taken into account when retrieving the identifier from the database.

It may be clear for the skilled person that the previous embodiments of the method may be combined in one way or another resulting in embodiments which also fall under the scope of the invention.

The invention also relates to a recording medium comprising computer executable program code configured to instruct a computer to perform a method according to any of the previous embodiments.

The invention also relates to a printer system comprising a printer for printing a print job on a media, a computer comprising a database of identifiers corresponding to leftovers of media, each identifier encoded in a machine readable tag on the corresponding leftover, determining means for determining media characteristics of a media for printing the print job on, retrieving means for retrieving an identifier from the database corresponding to a leftover of the media characteristics determined by the determining means, and locating means for locating a leftover corresponding to an identifier retrieved by the retrieving means.

According to an embodiment of the printer system the database comprises for each leftover a cut path applied to the leftover, which cut path is taken into account when retrieving an identifier from the database by the retrieving means.

According to another embodiment the printer system comprises a portable radio system for locating the leftover, wherein the machine readable tag on the leftover is detectable by the portable radio system and corresponding to an identifier retrieved by the retrieving means.

The database may be used to actively reduce storage of left overs by offering lower prices to the customers in accordance with the leftovers in stock and how much of a media type is left over. The database may also be used by an owner of the database to prepare an actual view on total stock cost, to prepare an actual view on how long a period of time a leftover is in stock in combination with an expiration date, to compare batches of media types with assessments on media types by customers.

It may be clear for the skilled person that the previous embodiments of the printer system may be combined in one way or another resulting in embodiments which also fall under the scope of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

Hereinafter the present invention is further elucidated with references to the appended drawing showing a non-limiting embodiment and wherein:

FIG. 1 is a print system in which the invented method is applicable.

DETAILED DESCRIPTION OF EMBODIMENTS

FIG. 1 shows a print system comprising a printer 5 for printing digital images according to a print job according to an embodiment of the method according to the invention. In a first step S1 at least one digital image 2,3 packaged in a PDL object 1 (Page Description Language) is submitted to the printer 5 together with a job ticket which specifies the type of media to be printed upon. This type of media 4 is loaded into the printer 5 or placed on a flat bed of the printer. FIG. 1 shows a flat bed printer but the invention is also applicable to any kind of roll fed printer or any kind of cut sheet printer. In a second step S2 the digital images 2, 3 are printed on the loaded piece of media 4 and cut out or off from the piece of media resulting in two printed pieces 6, 7. The cutting is done by a cutting device built-in in the printer or attached as a finishing module to the printer. A left over 8 of the piece of media comprises now two holes 9, 10 at which the two images were printed and cut out. In an additional step it is determined whether a usable left over piece remains after printing the print job on the media, for example by taking into account a size and a shape of the left over 8.

In a third step S3 the leftover 8 is tagged with a machine readable tag 13, like an RFID, having an encoded identifier like a reference number, a bar code or a QR code. The leftover 8 with the tagged RFID 13 may be stored in a repository (not shown). The RFID may also be used by the cutting device in order to get relevant information for the cutting process and further workflow steps. The tagged RFID is becoming the unique key that is followed through the workflow. The cutting device may also be connected to a computer connected by wire or wireless to the printer 5 for transmission of information from a database 11.

In a fourth step S4 a digital object 12—schematically displayed in FIG. 1—is created in the database 11 on a computer which is connected by wire or wireless to the printer 5. The digital object 12 corresponds to the leftover 8 and comprises its supplier, its batch, its received time at stock, its dimensions, its media characteristics like the type of media and a reference 14 corresponding to the RFID 13, and may optionally comprise its shape (with holes 9, 10) and its cut path related to the holes 9, 10.

In a fifth step S5 a new PDL object 16 comprising three digital images 2, 16, 18 is submitted to the printer 5 for printing on the same type of media 4.

In a sixth step S6 a control unit (not shown) of the printer submits a query to the database 11 for a piece of media suitable for printing the three digital images 2, 16, 18 on that piece.

In a seventh step S7 the computer sends the result of the query—for example an identifier corresponding to an RFID on a leftover—to a portable radio system 15. In an eighth step S8 the portable radio system 15 locates the leftover 8 identified by RFID 13, for example in a repository. The leftover 8 has enough media area left over to print the three digital images 2, 16, 18. The cut path of the previous cut out printed pieces 6, 7 has been taken into account. A user interface may be coupled to the computer on which the database resides or may be coupled to the radio system for showing a preview of the leftover 8 with the holes 9, 10 and the three images 2, 16, 18 to be printed on the leftover 8. The user may be able to move the three images 2, 16, 18 around the free space on the leftover 8 by means of mouse movements or finger movements.

In a following step the user inserts the leftover 8 in the printer 5 for printing the PDL object 16, i.e. the three digital images 2, 16, 18 upon the leftover 8.

The print system may also be configured in such a way that the database 11 is residing on the control unit of the printer 5 making an additional computer superfluous.

The above disclosure is intended as merely exemplary, and not to limit the scope of the invention, which is to be determined by reference to the following claims.

The invention claimed is:

1. A method for printing a print job on a printer system, the method comprising the steps of:
   a) receiving a print job for printing at least one digital image by the printer system;
   b) determining media characteristics of a media for printing the print job on;
   c) determining whether a usable left over piece remains after printing the print job on the media;
   d) printing the print job on the media, including cutting the at least one printed digital image out or off from the media and providing the remaining left over piece with a machine readable tag; and
   e) storing in a database an identifier encoded in the machine readable tag, together with the determined media characteristics.

2. A method for printing a print job on a printer system, the method comprises the steps of:
   a) receiving a print job for printing at least one digital image by the printer system
   b) determining media characteristics of a media for printing the print job on;
   c) retrieving from a database an identifier corresponding to a leftover of media of the determined media characteristics, wherein the identifier is encoded in a machine readable tag on the leftover, the leftover being a leftover after a printing and a cutting operation applied upon the media after printing;
   d) locating the leftover corresponding to the identifier by means of the machine readable tag on the left over; and
   e) printing the at least one digital image on the located leftover.

3. The method according to claim 2, wherein the retrieved identifier corresponds to a leftover which is large enough to print the at least one digital image upon.

4. The method according to claim 2, wherein the locating step comprises a sub-step of using a portable radio system to find the leftover, wherein the machine readable tag on the leftover is detectable by the portable radio system and corresponding to the retrieved identifier.

5. The method according to claim 2, wherein the database comprises for each leftover a cut path applied to the leftover, which cut path is taken into account when retrieving the identifier from the database.

6. A non-transitory recording medium comprising computer executable program code configured to instruct a computer to perform the method according to claim 1.

7. A printer system comprising:
   a printer for printing a print job on a media;
   a computer comprising a database of identifiers corresponding to leftovers of media, each identifier encoded in a machine readable tag on the corresponding leftover;
   determining means for determining media characteristics of a media for printing the print job on;
   retrieving means for retrieving an identifier from the database corresponding to a leftover of the media characteristics determined by the determining means; and
   locating means for locating a leftover corresponding to an identifier retrieved by the retrieving means.

8. The printer system according to claim 7, wherein the database comprises for each leftover a cut path applied to the leftover, which cut path is taken into account when retrieving an identifier from the database by the retrieving means.

9. The printer system according to claim 7, wherein the printer system comprises a portable radio system for locating the leftover, wherein the machine readable tag on the leftover is detectable by the portable radio system and corresponding to an identifier retrieved by the retrieving means.

10. The printer system according to claim 7, wherein the database comprises for each left over media characteristics of the left over.

11. A non-transitory recording medium comprising computer executable program code configured to instruct a computer to perform the method according to claim 2.

12. A non-transitory recording medium comprising computer executable program code configured to instruct a computer to perform the method according to claim 3.

13. A non-transitory recording medium comprising computer executable program code configured to instruct a computer to perform the method according to claim 4.

14. A non-transitory recording medium comprising computer executable program code configured to instruct a computer to perform the method according to claim 5.

* * * * *